UNITED STATES PATENT OFFICE.

CHARLES M. DUPUY, OF NEW YORK, N. Y.

IMPROVEMENT IN THE MANUFACTURE OF IRON AND STEEL DIRECTLY FROM THE ORE.

Specification forming part of Letters Patent No. 46,549, dated February 28, 1865.

*To all whom it may concern:*

Be it known that I, CHARLES M. DUPUY, of the city, county, and State of New York, have invented certain new and useful Improvements in the Manufacture of Iron and Steel Directly from the Ore by a series of processes particularly adapted to the working of the ores containing sulphur and other impurities that may be volatilized; and I do hereby declare and ascertain my said invention in the following description and claims.

In the attempt heretofore made to manufacture iron directly from the ore some parts thereof have proved correct; but as yet no continuous process has been found that will make pure iron, especially from the rich impure ores, without a great loss of the iron and a proportionate waste of fuel, labor, &c.

My improvement consists in the combination of such elementary devices as I have found by long, labored, and costly experiments to produce iron of the best quality, or steel if required, with little or no loss of the iron contained in the ore.

The expulsion of sulphur and other gaseous impurities that may be evolved from iron ores at a red heat, and consequent oxidization thereof with steam, superheated steam, or the gaseous products thereof, have been discovered and applied by different parties in various well-arranged devices. They are not my invention.

I have by close observation discovered by repeated experiments and investigations that although iron ore may be thoroughly separated from its sulphurous and other gaseous impurities and completely oxidized by the before-named agencies, yet to completely and thoroughly reduce it to metallic iron without material loss or waste, so as to produce the largest yield, requires that the ores so oxidized shall thereafter be raised to a red heat in a close chamber of any convenient form or device in contact with a suitable proportion of carbon or other deoxidizing substances or vapors, and that there shall be sufficient space in said chambers to allow a proper expansion of the gases generated, there being an opening for their escape only, while at the same time the atmospheric air is excluded during the process of deoxidizing the ore. I have discovered that while the ore is in process of deoxidization its progress is arrested by contact with the oxygen and nitrogen of the atmosphere, whether coming from the outside of the furnace through an imperfectly-tight crucible or chamber containing the ore, or whether they are introduced through the furnace by the blast or otherwise, which prevents the "naturing" of a large portion of the iron, and the ore is thus brought to the welding-furnace in a partially "raw" state by reason of the gases that are contained in it. Consequently a portion of the iron is impure when balled up, and the impurities are not wholly driven out in compressing the bloom, and remain therein more or less throughout all the after processes of fabrication, to the great injury of the quality of the iron. Besides this, a very large proportion of the iron contained in the ore is wasted and drawn off in the form of slag or scoria. It is well known that not more than fifty per cent. of the iron is extracted from the rich ores by any of the methods heretofore essayed in making iron direct from the ore.

To manufacture iron by my process, I drive out the sulphur and other impurities that can be volatilized by any of the best modes now known and practiced for desulphurizing and oxidizing ores—such as the process described by Robert George in his patent granted on the 3d April, 1860—in which state the ore is oxidized. I then put it in a chamber in a crushed or pulverized state, mixed with carbon or other deoxidizing substances, and the atmospheric air is carefully excluded therefrom, there being but a single small flue or flues for the escape of gas from each of said chamber or chambers. This mass is heated up to a red heat and kept in that state until the ore is thorough deoxidized, which will generally be in from four to six hours, and which is easily determined by the escaping gases ceasing to burn at the top of the escape-flue. On the completion of this process the ore is then, in the state of a spongy mass of pure metallic iron, combined mechanically with earthy matter, and is thence removed or allowed to pass into the welding-furnace and formed into balls, ready for the hammer or squeezer. This process of welding does not require the intense heat of the ordinary puddling-furnace; but the particles of iron, being thoroughly brought to nature by the previous processes at the very moderate heat described, have an affinity for each other, and are readily consolidated at a low welding-heat far below the melting-heat usually employed in ordinary puddling or welding processes, which destroys so large a portion of the iron submitted thereto owing to the imperfect naturing of the iron in the previous process.

If I intend to make steel instead of iron, I keep the ore (in the spongy deoxidized mass just described) in contact with the carbon for a longer time, until it has absorbed sufficient carbon for the purpose desired, when it can be worked or melted in any of the various ways in which steel is made, it being then in the best possible state to receive the charge of carbon for its conversion.

The important advantages arising from my discovery of this series of operations requisite to manufacture iron and steel directly from the ore are, first, that all, or nearly all, of the atoms of metallic iron existing in the rich magnetic and other iron ores may be saved; second, the process involves and requires a much lower temperature of heat than is now employed, and consequently a large economy in the use of fuel is effected; third, the reduction of the quantity of ore and fuel required for a given amount of iron made into blooms effects a large saving of labor; fourth, the ready and uniform conversion of the spongy deoxidized ore into steel; fifth, the advantageous working of sulphurous and other gaseous rich iron ores heretofore considered almost worthless.

I am aware that close crucibles, muffles, or chambers for heating iron ores in contact with carbon or other deoxidizing substances were patented and long since experimentally tried and abandoned as unsuccessful in combination with the waste heat of a reverberatory furnace, and otherwise. I have myself expended large sums in trying to make iron thereby by the process of Quilliard, Dickinson, Reaton, &c.; but until I combined the desulphurizing process therewith, providing for a more sufficient expansion of the gases in the close chambers, and also effectually excluding the atmospheric air, it was not practically valuable. With it the process is simple, cheap, and certain.

It is obvious that other ores than those of iron can be treated in like manner, which I deem a part of my discovery, although in this description I have only named iron ores.

Having thus fully described my improvement or discovery, what I claim therein, and for which I desire Letters Patent, is—

1. The combination of desulphurizing, &c., and oxidizing, as herein set forth, with the process of deoxidizing, substantially as and for the purposes specified.

2. The combination of the desulphurizing and deoxidizing and carbonizing processes in the manufacture of steel, as described.

3. The combination of the desulphurizing and deoxidizing processes with the welding-furnace, by which iron is manufactured at a low degree of heat, as set forth.

CHARLES M. DUPUY.

Witnesses:
J. J. GREENOUGH,
A. C. TONNER.